(12) United States Patent
Wei

(10) Patent No.: US 11,209,718 B2
(45) Date of Patent: Dec. 28, 2021

(54) LENS MODULE

(71) Applicant: AAC Technologies Pte. Ltd., Singapore (SG)

(72) Inventor: Chuandong Wei, Shenzhen (CN)

(73) Assignee: AAC Optics Solutions Pte. Ltd., Singapore (SG)

(*) Notice: Subject to any disclaimer, the term of this patent is extended or adjusted under 35 U.S.C. 154(b) by 265 days.

(21) Appl. No.: 16/529,776

(22) Filed: Aug. 1, 2019

(65) Prior Publication Data
US 2020/0050080 A1    Feb. 13, 2020

(30) Foreign Application Priority Data
Aug. 10, 2018    (CN) .......................... 201821302605.6

(51) Int. Cl.
*G03B 11/04*    (2021.01)
*G02B 23/16*    (2006.01)
*G03B 17/12*    (2021.01)

(52) U.S. Cl.
CPC ............ *G03B 11/045* (2013.01); *G02B 23/16* (2013.01); *G03B 17/12* (2013.01)

(58) Field of Classification Search
CPC .............................. G03B 17/12; G03B 11/045
See application file for complete search history.

(56) References Cited

U.S. PATENT DOCUMENTS

| | | | | |
|---|---|---|---|---|
| 8,320,059 | B2* | 11/2012 | Lin | G02B 5/003 359/740 |
| 8,967,814 | B2* | 3/2015 | Chang | G02B 13/0045 359/611 |
| 8,985,789 | B2* | 3/2015 | Cho | G02B 13/0035 359/611 |
| 2006/0171046 | A1* | 8/2006 | Recco | G02B 7/022 359/811 |
| 2012/0314288 | A1* | 12/2012 | Lai | G02B 13/0035 359/503 |
| 2015/0022896 | A1* | 1/2015 | Cho | G02B 1/11 359/601 |
| 2016/0223776 | A1* | 8/2016 | Choi | G02B 7/023 |
| 2019/0064399 | A1* | 2/2019 | Wang | G03B 17/12 |

* cited by examiner

*Primary Examiner* — Clayton E. LaBalle
*Assistant Examiner* — Dennis Hancock
(74) *Attorney, Agent, or Firm* — W&G Law Group

(57) ABSTRACT

The present disclosure relates to the field of optical lenses, and discloses a lens module. In the present disclosure, the lens module includes a lens barrel, a first lens disposed in the lens barrel, and a light shading member disposed in the lens barrel and abutting against the first lens. The first lens includes an optical portion for imaging and a supporting portion surrounding the optical portion. The supporting portion is recessed from an object side towards an image side to form a receiving portion. The light shading member is at least partially disposed in the receiving portion in a direction of an optical axis. The lens module according to the present disclosure can facilitate achieving a miniaturized design.

7 Claims, 4 Drawing Sheets

LENS MODULE

TECHNICAL FIELD

The present disclosure relates to the field of optical lenses, and more particularly, to a lens module.

BACKGROUND

In recent years, with the continuous development of technology, electronic devices are constantly developed to the direction of intelligentization. In addition to digital cameras, portable electronic devices such as tablet computers and mobile phones are also equipped with lens modules. In order to meet the use needs of people, there are higher requirements on the miniaturized design of the lens module. In the related art, the lens module generally includes a lens barrel, a plurality of lenses stacked in the lens barrel, and a light shading member disposed between the lenses.

The inventors of the present disclosure have found that there are at least the following problems in the related art: due to the arrangement of the light shading member (such as a light shading plate) between the lenses in the related art, the size of the lens module will be increased, thereby affecting the requirement of the miniaturized design of the lens module.

BRIEF DESCRIPTION OF THE DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be further illustrated with reference to the accompanying drawings and the embodiments.

Figure 1:
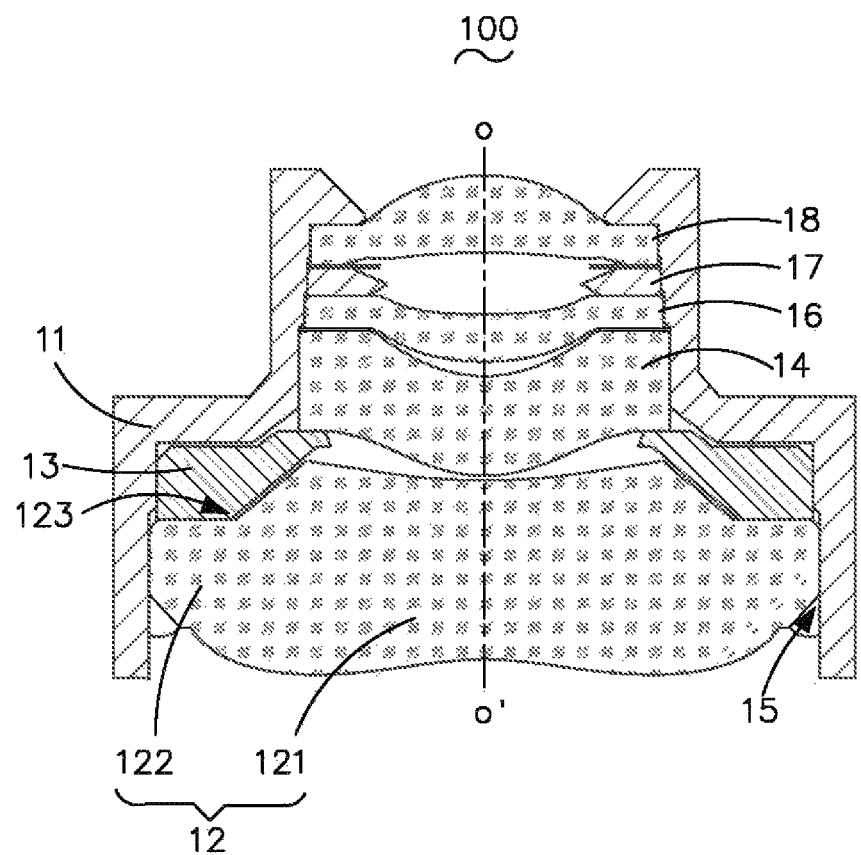
FIG. 1 is a cross-sectional schematic structural view of a lens module according to an embodiment of the present disclosure.

The embodiment of the present disclosure relates to a lens module 100. As shown in FIG. 1, the lens module 100 includes a lens barrel 11, a first lens 12, and a light shading member 13. The first lens 12 is disposed in the lens barrel 11, and the light shading member 13 is disposed in the lens barrel 11 and abuts against the first lens 12. The first lens 12 includes an optical portion 121 and a supporting portion 122. The optical portion 121 is configured for imaging of the lens module, and the supporting portion 122 surrounds the optical portion 121. The supporting portion 122 is recessed from an object side towards an image side to form a receiving portion 123. The light shading member 13 is at least partially received in the receiving portion 123 in a direction of an optical axis OO'.

According to the embodiment of the present disclosure, compared with the related art, the receiving portion 123 recessed from the object side towards the image side is disposed on the supporting portion 122 of the first lens 12, and the light shading member 13 is at least partially disposed in the receiving portion 123 along the direction of the optical axis OO'. Compared with the case where the light shading member 13 is directly erected on the lens 12 on which the receiving portion 123 is not disposed, the space occupied by the lens 12 in the direction of the optical axis OO' overlaps with the space occupied by the light shading member 13 in the receiving portion 123, thereby saving the receiving space in the lens barrel 11. In the case of not reducing the elements in the lens barrel 11, the size of the lens barrel 11 in the direction of the optical axis OO' is reduced, thereby facilitating the miniaturized design of the lens module 100. In addition, the light shading member 13 is disposed in the lens barrel 11 to facilitate separation of the first lens 12 from other optical elements (such as other lenses) in the lens barrel 11, thereby leaving gaps between the first lens 12 and other elements. The first lens 12 or other optical elements are prevented from being damaged by hard contact or excessive extrusion of the first lens 12 with other optical elements.

It should be noted that the light shading member 13 is at least partially disposed in the receiving portion 123 in the direction of the optical axis OO', and "in the direction of the optical axis OO'" refers to the direction from the object side to the image side. Specifically, the light shading member 13 includes a projection extending in the direction of the optical axis OO', and the projection is partially or entirely embedded in the receiving portion 123. In the present embodiment, the projection is partially embedded in the receiving portion 123.

The details of the lens module of the present embodiment will be specifically described below. The following content is only for the convenience of understanding of the provided implementation details, and is not necessary for implementing the solution.

Figure 2:
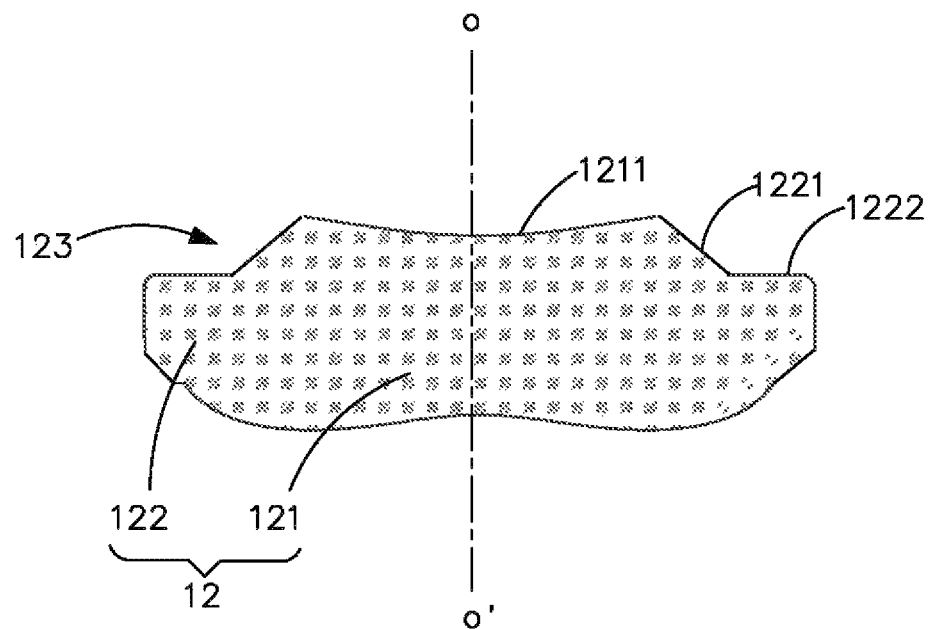
FIG. 2 is a cross-sectional schematic structural view of a first lens of a lens module according to an embodiment of the present disclosure.

Specifically, as shown in FIG. 2, the optical portion 121 includes a first surface 1211 close to the object side, and the supporting portion 122 includes a second surface 1221 extending from the edge of the first surface 1211 towards the image side in a direction facing away from the optical axis OO', and a third surface 1222 extending from the second surface 1221 in a direction facing away from and perpendicular to the optical axis OO'. The second surface 1221 and the third surface 1222 define the receiving portion 123. It can be understood that the receiving portion 123 may be a recess defined by the second surface 1221 and the third surface 1222 and recessed from the object side towards the image side. The light shading member 13 includes a projection extending in the direction of the optical axis OO'. The projection is partially or completely disposed in the recess, and in the present embodiment, the projection is partially disposed in the recess.

Figure 3:
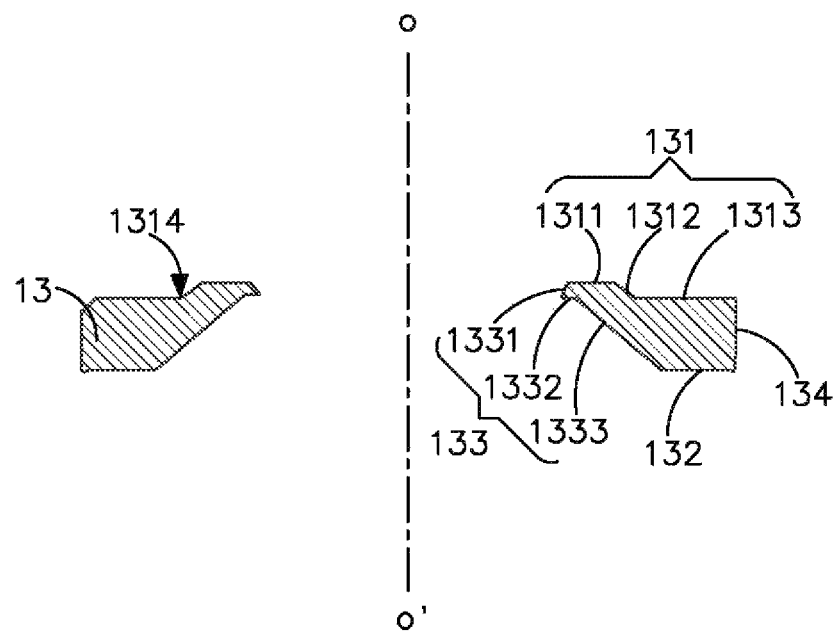
FIG. 3 is a cross-sectional schematic structural view of a light shading member of a lens module according to an embodiment of the present disclosure.

Specifically, as shown in FIG. 3, the light shading member 13 includes an object side surface 131 close to the object side, an image side surface 132 close to the image side, an inner edge surface 133 connecting the object side surface 131 with the image side surface 132 and defining a light-passing hole 130, and an outer edge surface 134 connecting the object side surface 131 with the image side surface 132 and abutting against the lens barrel 11. It can be understood that in the present embodiment, the outer edge surface 134, the inner edge surface 133, and the image side surface 132 of the light shading member 13 define the projection extending in the direction of the optical axis OO', and the projection is partially embedded in the receiving 123. Meanwhile, the abutting between the outer edge surface 134 and the lens barrel 11 is favorable for maintaining the stability of the light shading sheet 13 in the lens barrel 11. It should be noted that in the present embodiment, the light shading member 13 may be a light shading plate. Since the light shading plate is thicker than a light shading sheet, the light shading plate can be partially embedded in the receiving portion 123 to achieve the effect of shading stray light.

In addition, referring to FIG. 1 and FIG. 3, the lens module 100 further includes a second lens 14 disposed in the lens barrel 11, and the second lens 14 abuts against the object side surface 131. In this way, the second lens 14 and the light shading member 13 can be fixed more firmly in the lens barrel 11. This can avoid the influence on the reliability of the entire lens module 100 since the second lens 14 and the light shading member 13 are shaken in the lens barrel 11 when the electronic device on which the lens module 100 is mounted is used.

Specifically, as shown in FIG. 3, the object side surface 131 includes a first planar surface 1311 abutting against the second lens 14, an inclined wall surface 1312 extending from the first planar surface 1311 towards the image side in a direction facing away from the optical axis OO', and a second planar surface 1313 extending from the inclined wall surface 1312 in a direction facing away from the optical axis OO' and perpendicular to the optical axis OO'. The inclined wall surface 1312 and the second planar surface 1313 form a first step 1314. Since the inclined wall surface 1312 and the second planar surface 1313 form the first step 1314, the first planar surface 1311 and the inclined wall surface 1312 are projected towards the object side relative to the second planar surface 1313, so that the first planar surface 1311 can support the second lens 14 to reserve a gap between the lens 12 and the second lens 14, thereby avoiding the damage on the first lens 12 or the second lens 14 due to hard contact or excessive extrusion of the first lens 12 and the second lens 14.

Figure 4:
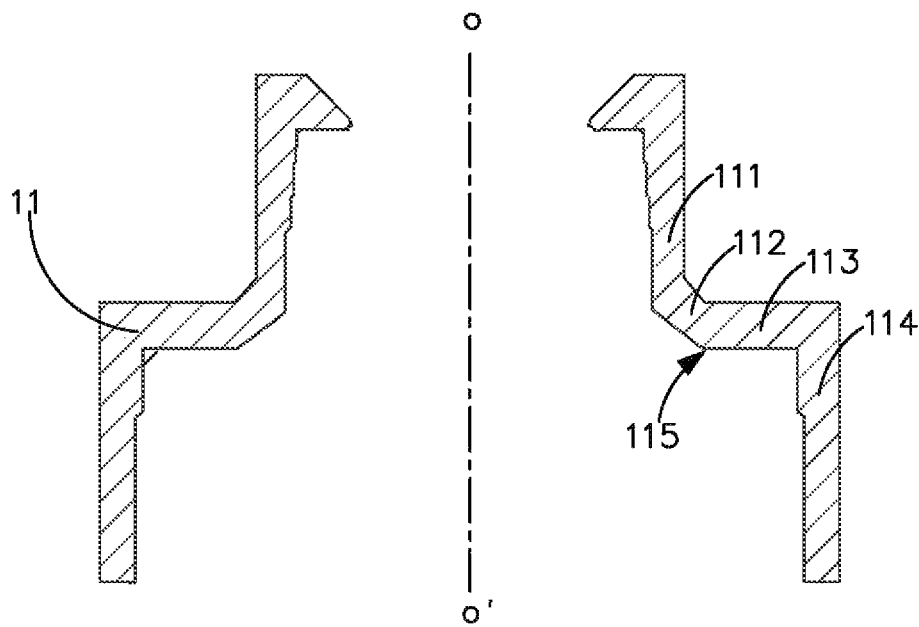
FIG. 4 is a cross-sectional schematic structural view of a lens barrel of a lens module according to an embodiment of the present disclosure.

Specifically, as shown in FIG. 1, FIG. 3 and FIG. 4, the lens barrel 11 includes a first barrel wall 111 abutting against a circumference of the second lens 14, a second barrel wall 112 extending from an edge of the first barrel wall 111 close to the image side towards the image side in a direction facing away from the optical axis OO', a third barrel wall 113 extending from an edge of the second barrel wall 112 facing away from the first barrel wall 111 in a direction facing away from and perpendicular to the optical axis OO', and a fourth barrel wall 114 extending from an edge of the third barrel wall 113 facing away from the optical axis OO' towards the image side along the direction of the optical axis OO'. The fourth barrel wall 114 abuts against the outer edge surface 134, and the second barrel wall 112 and the third barrel wall 113 form a second step 115 spaced apart from the first step 1314. In this way, the damage on the lens barrel 11 or the light shading member 13 due to the hard contact or excessive extrusion of the first step 1314 and the second step 115 can be avoided.

Specifically, the image side surface 132 abuts against the third surface 1222. In this way, the light shading sheet 13 is prevented from shaking in the lens barrel 11, thereby further maintaining the stability of the light shading sheet 13 in the lens barrel 11, and improving the reliability of the entire lens module 100.

Specifically, as shown in FIG. 3, the inner edge surface 133 includes a first side wall 1331 extending from the edge of an object side surface 131 close to the optical axis OO' towards the image side in a direction facing towards the optical axis OO', a second side wall 1332 extending from an edge of the first side wall 1331 close to the image side in a direction facing away from and perpendicular to the optical axis OO', and a third side wall 1333 extending from an edge of the second side wall 1332 facing away from the optical axis OO' to the image side surface in a direction facing away from the optical axis OO', and the third side wall 1333 is spaced apart from the second surface 1221. Since the third side wall 1333 is spaced apart from the second surface 1221, the damage on the first lens 12 or the light shading member 13 due to hard contact or excessive extrusion of the third side wall 1333 and the second surface 1221 can be avoided.

As an example, the second surface 1221 is provided with an extinction area, and specifically, the extinction area may be a roughened surface or a surface coated with an extinction material. The extinction area can absorb/weaken the stray light incident on the second surface 1221, thereby improving the imaging quality of the lens module 100.

In the present embodiment, as shown in FIG. 1, a groove 15 is defined between an edge of the supporting portion 122 close to the image side and the lens barrel 11, and the groove 15 is filled with glue. In this way, due to the glue filled in the groove 15, the first lens 12 and the lens barrel 11 can be fixed more firmly, thereby improving the reliability of the lens module 100. Of course, in the optional embodiment of the present disclosure, a pressure ring may be disposed on the edge of the first lens 12 close to the image side, and the first lens 12 and the lens barrel 11 are fixed by dispensing on the pressure ring.

In addition, as shown in FIG. 1, the lens module 100 further includes a third lens 16 disposed on an object side of the second lens 14, a fourth lens 17 disposed on an object side of the third lens 16, and a fifth lens 18 disposed on an object side of the fourth lens 17.

Those of ordinary skill in the art can understand that the above embodiments are specific embodiments for implementing the present disclosure. In actual application, various changes can be made in form and detail without departing from the spirit and scope of the present disclosure.

The invention claimed is:

1. A lens module, comprising:
   a lens barrel;
   a first lens disposed in the lens barrel; and
   a light shading member disposed in the lens barrel and abutting against the first lens,
   wherein the first lens comprises an optical portion for imaging and a supporting portion surrounding the optical portion, the supporting portion is recessed from an object side towards an image side to form a receiving portion, and the light shading member is at least partially disposed in the receiving portion in a direction of an optical axis,
   wherein the optical portion comprises a first surface close to the object side, the supporting portion comprises a second surface extending from an edge of the first surface towards the image side in a direction facing away from the optical axis and a third surface extending from the second surface in a direction facing away from and perpendicular to the optical axis, the second surface and the third surface defining the receiving portion,
   wherein the light shading member comprises an object side surface close to the object side, an image side surface close to the image side, an inner edge surface connecting the object side surface with the image side surface and defining a light-passing hole, and an outer edge surface connecting the object side surface with the image side surface and abutting against the lens barrel, wherein the inner edge surface comprises a first side wall extending from an edge of the object side surface close to the optical axis towards the image side in a direction facing towards the optical axis, a second side wall extending from an edge of the first side wall close to the image side in the direction facing away from and perpendicular to the optical axis, and a third side wall extending from an edge of the second side wall facing away from the optical axis to the image side surface in the direction facing away from the optical axis, the third side wall being spaced apart from the second surface.

2. The lens module as described in claim 1, further comprising:
a second lens disposed in the lens barrel, the second lens abutting against the object side surface.

3. The lens module as described in claim 2, wherein the object side surface comprises a first planar surface abutting against the second lens, an inclined wall surface extending from the first planar surface towards the image side in the direction facing away from the optical axis, and a second planar surface extending from the inclined wall surface in the direction facing away from and perpendicular to the optical axis, the inclined wall surface and the second planar surface forming a first step.

4. The lens module as described in claim 3, wherein the lens barrel comprises a first barrel wall abutting against a circumference of the second lens, a second barrel wall extending from an edge of the first barrel wall close to the image side towards the image side in the direction facing away from the optical axis, a third barrel wall extending from an edge of the second barrel wall facing away from the first barrel wall in the direction facing away from and perpendicular to the optical axis, and a fourth barrel wall extending from an edge of the third barrel wall facing away from the optical axis towards the image side along a direction of the optical axis, the fourth barrel wall abutting against the outer edge surface, and the second barrel wall and the third barrel wall forming a second step spaced apart from the first step.

5. The lens module as described in claim 1, wherein the image side surface abuts against the third surface.

6. The lens module as described in claim 1, wherein the second surface is provided with an extinction area.

7. The lens module as described in claim 1, wherein a groove is defined between the lens barrel and an edge of the supporting portion close to the image side, the groove being filled with glue.

* * * * *